United States Patent
Ozeki et al.

(10) Patent No.: US 12,453,362 B2
(45) Date of Patent: Oct. 28, 2025

(54) ASTRINGENCY REDUCING AGENT

(71) Applicant: KAO CORPORATION, Tokyo (JP)

(72) Inventors: Eri Ozeki, Oyama (JP); Akihiro Takamura, Haga-gun (JP); Kohjiro Hashizume, Utsunomiya (JP); Yoriko Ooki, Bunkyo-ku (JP); Tomoya Takahashi, Chiba (JP)

(73) Assignee: KAO CORPORATION, Tokyo (JP)

( * ) Notice: Subject to any disclaimer, the term of this patent is extended or adjusted under 35 U.S.C. 154(b) by 421 days.

(21) Appl. No.: 17/998,953

(22) PCT Filed: May 28, 2021

(86) PCT No.: PCT/JP2021/020386
§ 371 (c)(1),
(2) Date: Nov. 16, 2022

(87) PCT Pub. No.: WO2021/246308
PCT Pub. Date: Dec. 9, 2021

(65) Prior Publication Data
US 2023/0225382 A1 Jul. 20, 2023

(30) Foreign Application Priority Data
Jun. 1, 2020 (JP) .................. 2020-095597

(51) Int. Cl.
A23L 27/00 (2016.01)
A23L 2/56 (2006.01)

(52) U.S. Cl.
CPC .............. *A23L 27/84* (2016.08); *A23L 2/56* (2013.01)

(58) Field of Classification Search
CPC ............ A23L 27/56; A23L 27/84; A23L 2/56
See application file for complete search history.

(56) References Cited

U.S. PATENT DOCUMENTS

| | | |
|---|---|---|
| 2008/0213441 A1 | 9/2008 | Ludwig et al. |
| 2011/0104358 A1 | 5/2011 | Furuta et al. |
| 2013/0209651 A1 | 8/2013 | Furuta et al. |
| 2015/0342854 A1 | 12/2015 | Shibuya et al. |
| 2019/0008747 A1 | 1/2019 | Shibuya et al. |
| 2022/0054641 A1 | 2/2022 | Ozeki et al. |

FOREIGN PATENT DOCUMENTS

| | | |
|---|---|---|
| CN | 101573046 A | 11/2009 |
| CN | 103859121 A | 6/2014 |
| IN | 201948021471 A | 9/2019 |
| JP | 2002-095450 A | 4/2002 |
| JP | 2016-187344 A | 11/2016 |
| JP | 2018-000192 A | 1/2018 |
| JP | 2018-174758 A | 11/2018 |
| JP | 2019-000099 A | 1/2019 |
| JP | 2020-092666 A | 6/2020 |
| JP | 2020-092667 A | 6/2020 |
| WO | WO 2014/103475 A1 | 7/2014 |

OTHER PUBLICATIONS

Grube, et al. "Tolerability of a proprietary larch arabinogalactan extract: a randomized, double-blind, placebo-controlled clinical trial in healthy subjects". Available online from Food and Nutrition Sciences, Mar. 2012, 1533-1538. (Year: 2012).*

International Search Report issued Jul. 27, 2021 in PCT/JP2021/020386 filed on May 28, 2021, 2 pages.

Hayashi, "Reduction Mechanism of the Astringent Taste of Green Tea Catechins with Water-soluble Polysaccharides", Final Research Report of Grant-in-Aid for Scientific Research (Project No. 19500674), Jun. 17, 2011, 4 pages (with English Abstract).

Hui H. Chong, et al., "Soluble cell wall carbohydrates and their relationship with sensory attributes in Cabernet Sauvignon wine", Food Chemistry No. 298, Dec. 31, 2019, pp. 1-9.

Natalia Quijada-Morín, et al., "Polyphenolic, polysaccharide and oligosaccharide composition of Tempranillo red wines and their relationship with the perceived astringency", Food Chemistry No. 154, Dec. 31, 2014, pp. 44-51.

Extended European Search Report issued Jun. 4, 2024, in corresponding European Patent Application No. 21818061.0, 13 pages.

Elisabete Carvalho, et al., "Influence of Wine Pectic Polysaccharides on the Interactions between Condensed Tannins and Salivary Proteins", J. Agric. Food Chem., vol. 54, No. 23, Nov. 1, 2006, pp. 8936-8944, XP93165456, US, ISSN: 0021-8561, doi:10.1021/jf061835h.

Stéphane Vidal, et al., "The mouth-feel properties of polysaccharides and anthocyanins in a wine like medium", Food Chemistry, vol. 85, No. 4, May 1, 2004, pp. 519-525, XP93165421, NL, ISSN: 0308-8146, doi:10.1016/S0308-8146(03)00084-0.

A. Vernhet, "Charge Properties of Some Grape and Wine Polysaccharide and Polyphenolic Fractions", American Journal of Enology and Viticulture, vol. 47, No. 1, Jan. 1, 1996, pp. 25-30, XP0931656661, US, ISSN: 0002-9254, DOI: 10.5344/ajev.1996.47.1.25, Retrieved from the Internet: URL:https://dx.doi.org/10.5344/ajev.1996.47.1.25.

P. Pellerin, et al., "Characterization of two arabinogalactan-proteins from red wine", Carbohydrate Polymers, Applied Science Publishers, Ltd Barking, GB, vol. 22, No. 3, Jan. 1, 1993, pp. 187-192, XP024147495, ISSN: 0144-8617, doi:10.1016/0144-8617(93)90139-U [retrieved on Jan. 1, 1993].

P. Pellerin, et al., "Characterization of five type II arabinogalactan-protein fractions from red wine of increasing uronic acid content", Carbohydrate Research, Pergamon, GB, vol. 277, No. 1, Nov. 7, 1995, pp. 135-143, XP004021838, ISSN: 0008-615, DOI:10.1016/0008-6215(95)00206-9.

(Continued)

Primary Examiner — Jenna A Watts
(74) Attorney, Agent, or Firm — Oblon, McClelland, Maier & Neustadt, L.L.P.

(57) ABSTRACT

An astringency reducing agent including an arabinogalactan which has a molecular weight of from 10,000 to 1,000,000 and a ratio of 1,3-bound galactose to total galactose of 12 mol % or more, as an active ingredient. A method for reducing astringency, including blending the astringency reducing agent into an oral product including an astringent substance.

9 Claims, No Drawings

(56) References Cited

OTHER PUBLICATIONS

Yoichi Tsumuraya, et al., "Properties of arabinogalactan-proteins in European pear (*Pyrus communis* L.) fruits", Carbohydrate Research, Pergamon, GB, vol. 485, Sep. 13, 2019, XP085876328, ISSN: 0008-6215, DOI: 10.1016/j.carres.2019.107816[retrieved on Sep. 13, 2019].

Bradbury Allan G. W. et al, "Chemical structures of green coffee bean polysaccharides", J. Agric. Food Chem. vol. 38, No. 2, Feb. 1, 1990, pp. 389-392, XP93165326, US, ISSN: 0021-8561, doi: 10.1021/jf00092a010.

Yoichi Tsumuraya, et al., "Arabinogalactan-Proteins from Primary and Mature Roots of Radish (*Raphanus sativus* L.)", Plant Physiology, vol. 86, No. 1, Jan. 1, 1988, pp. 155-160, XP093166012, Rockville, Md, USA, ISSN: 0032-0889, doi: 10.1104/pp.86.1.155, Retrieved from the Internet: URL:https://dx.doi.org/10.1104/pp.86.1.155.

* cited by examiner

ASTRINGENCY REDUCING AGENT

CROSS REFERENCE TO RELATED APPLICATIONS

This application is a National Stage entry under 35 U.S.C. § 371 of PCT/JP2021/020386, filed on May 28, 2021, and claims priority to Japanese Patent Application No. 2020-095597, filed on Jun. 1, 2020. The entire contents of both are incorporated herein by reference.

FIELD OF THE INVENTION

The present invention relates to an astringency reducing agent which reduces astringency from an astringent substance.

BACKGROUND OF THE INVENTION

It is known that polyphenol has an antioxidant action, and is effective for prevention of lifestyle-related diseases such as arteriosclerosis. However, beverages and the like containing high concentration of polyphenol may have excessively strong astringency derived from polyphenol, and thus cause discomfort or disgust.

Various studies have been conducted on means for reducing such offensive astringency, and for example, grapefruit juice or lime juice has been reported to be effective for reduction of astringency derived from apple polyphenol (Patent Literature 1).

It has been reported that gum arabic containing an arabinogalactan protein complex at about 10% is capable of improving taste such as bitterness or astringency in stevia extract, sucralose or Siraitia grosvenorii extract (Patent Literature 2).

CITATION LIST

Patent Literatures

[Patent Literature 1] JP-A-2002-95450
[Patent Literature 2] JP-A-2016-187344

SUMMARY OF THE INVENTION

The present invention relates to the following 1) to 4).

1) An astringency reducing agent comprising an arabinogalactan which has a molecular weight of from 10,000 to 1,000,000 and a ratio of 1,3-bound galactose to total galactose of 12 mol % or more, as an active ingredient.

2) A method for reducing astringency, comprising a step of blending the astringency reducing agent according to 1) into an oral product comprising an astringent substance.

3) Use of an arabinogalactan which has a molecular weight of from 10,000 to 1,000,000 and a ratio of 1,3-bound galactose to total galactose of 12 mol % or more, for producing an astringency reducing agent.

4) Use of an arabinogalactan which has a molecular weight of from 10,000 to 1,000,000 and a ratio of 1,3-bound galactose to total galactose of 12 mol % or more, for reducing astringency.

DETAILED DESCRIPTION OF THE INVENTION

The present invention relates to provision of an astringency reducing agent which effectively reduces astringency from polyphenol or the like.

The present inventors conducted studies on a material capable of reducing offensive astringency from polyphenol or the like, and found that an arabinogalactan having a specific sugar configuration is effective for reduction of astringency.

According to the present invention, it is possible to effectively reduce offensive astringency derived from an astringent substance such as polyphenol. The astringency reducing agent of the present invention is a naturally derived component, has high safety, and therefore can be used in the fields of food and beverage products, medicaments and quasi-pharmaceutical products.

An arabinogalactan according to the present invention has a molecular weight of 10,000 to 1,000,000, and in the arabinogalactan, the ratio of 1,3-bound galactose to total galactose is 12 mol % or more.

The "arabinogalactan" refers to a polysaccharide containing arabinose and galactose as main components thereof. The arabinogalactan according to the present invention refers to a so-called type II arabinogalactan having 1,3-bound galactose as a main chain, and a side chain branched at position 6 of galactose as a main chain.

In the present invention, the "1,3-bound galactose" (also referred to as "3-Galp") means galactose which is in a bound state and in which only the hydroxy group at position 1 and the hydroxy group at position 3 form an ether bond with the hydroxy groups of other sugar molecules, that is, galactose having a structure of "3)-Gal-(1", and the galactose may be present on either the main chain or the side chain.

The "main chain" refers to a chain which is the longest in the sugar chain molecule, and the "side chain" refers to a chain which is branched from the main chain and is relatively short.

In the arabinogalactan according to the present invention, the ratio of 1,3-bound galactose to total galactose is 12 mol % or more, preferably 16 mol % or more, more preferably 18 mol % or more, more preferably 20 mol % or more, more preferably 22 mol % or more, and preferably 70 mol % or less, more preferably 60 mol % or less, preferably 50 mol % or less. The ratio is preferably from 12 to 70 mol %, more preferably from 16 to 70 mol %, more preferably from 18 to 70 mol %, more preferably from 20 to 60 mol %, more preferably from 22 to 50 mol %.

In the arabinogalactan according to the present invention, the molar content (%) of 1,3-bound galactose in the sum of galactose and arabinose in the arabinogalactan is 8 mol % or more, more preferably 10 mol % or more, more preferably 12 mol % or more, more preferably 14 mol % or more, and preferably 70 mol % or less, more preferably 50 mol % or less, more preferably 40 mol % or less. The molar content (%) is preferably from 8 to 70 mol %, more preferably from 10 to 70 mol %, more preferably from 12 to 60 mol %, more preferably from 14 to 50 mol %.

A small amount of sugars other than galactose and arabinose, such as glucose, rhamnose, fucose and glucuronic acid, may be present on the side chain of the arabinogalactan according to the present invention. In this case, the molar ratio of sugars other than galactose and arabinose, where the molar amount of galactose is defined as 1, is, for example, 10 or less, preferably 1 or less.

The molecular weight of the arabinogalactan according to the present invention is from 10,000 to 1,000,000, preferably 20,000 or more, 35,000 or more, 50,000 or more, or 65,000 or more, and preferably 500,000 or less, 350,000 or less, or 200,000 or less. The molecular weight is preferably from 10,000 to 500,000, more preferably from 20,000 to 500,000, more preferably from 35,000 to 350,000, more preferably from 50,000 to 350,000, more preferably from 65,000 to 200,000.

Analysis of the composition of the relevant arabinogalactan in a sugar chain binding state can be performed by a method known to those skilled in the art, for example, methylation analysis (F. A. Pettolino et al., Nature Protocols, 2012, 7, 1590-1607). The "ratio of 1,3-bound galactose to total galactose" in the present invention is also a numerical value calculated by this methylation analysis.

On the other hand, analysis of the "simple galactose and arabinose without sugar chain binding state information" can be performed by a constituent sugar analysis method combining hydrolysis with an acid such as trifluoroacetic acid and ion chromatography, or the like.

Measurement of the molecular weight can be performed by GPC (gel permeation chromatography) or the like. The molecular weight shown in the present application represents a peak top molecular weight during GPC analysis, and is calculated by comparison with a standard substance Shodex Standard P-82 (Shoko Co., Ltd.).

The arabinogalactan according to the present invention can be acquired by isolation and purification from a plant such as pear, green coffee or radish using known means.

Such a plant can be used as it is or as juice obtained by squeezing the plant, or in the form of a dried product obtained by drying the plant itself, or a pulverized product thereof, or in the form of an extract obtained by extraction therefrom. Examples of the extract include various solvent extracts obtained by extracting plants at normal temperature or elevated temperature or extracting plants using an extracting apparatus such as a Soxhlet extractor, diluted liquids thereof, concentrated liquids thereof, and dried powder thereof.

The solvent used for extraction may be water, a hydrophilic organic solvent, a hydrophobic organic solvent, or a mixture of two or more thereof, and is preferably water. The type of water is not particularly limited, and may be any of pure water, tap water and the like. The water may be subjected to any of normal treatments such as purification, disinfection, sterilization, filtration, osmotic adjustment and buffering, and for example, a buffer solution such as physiological saline or a phosphate buffer solution can also be used as an extracting solvent. Examples of the hydrophilic solvent include known hydrophilic organic solvents such as alcohols such as methyl alcohol, ethyl alcohol, butyl alcohol, glycerin, propylene glycol and 1,3-butylene glycol, acetone, tetrahydrofuran, acetonitrile, 1,4-dioxane, pyridine, dimethylsulfoxide, N,N-dimethylformamide, and acetic acid. Examples of the hydrophobic organic solvent include known hydrophobic organic solvents such as hexane, cyclohexane, carbon tetrachloride, chloroform, dichloromethane, 1,2-dichloroethane, diethyl ether, ethyl acetate, benzene, toluene, n-hexane, and isooctane. The extraction operation may be carried out with the solution pH adjusted by adding an acid or an alkali at the time of extraction.

The extraction means is not particularly limited, and common means such as solid-liquid extraction, liquid-liquid extraction, immersion, decoction, leaching, reflux extraction, Soxhlet extraction, ultrasonic extraction, microwave extraction and stirring.

Examples of the means used for isolation and purification of the arabinogalactan include reprecipitation, recrystallization, enzymatic degradation of contaminating components, acid decomposition, membrane filtration, ultrafiltration, dialysis, gel filtration chromatography, ion-exchange chromatography, affinity chromatography, and high performance liquid chromatography (HPLC). These means may be used alone, or two or more thereof may be used in combination.

The arabinogalactan according to the present invention may be a crude product containing a small amount of contaminants, is preferably free of contaminants detectable by a detection method such as HPLC and a test such as a bioassay, and may be one from which other components such as protein, lipids and carbohydrates have been removed.

The arabinogalactan according to the present invention can be purified from a plant such as pear, green coffee or radish, and may be purified from another plant. Whether or not a plant contains the arabinogalactan according to the present invention can be easily determined by HPLC analysis, ion chromatography analysis, the methylation analysis or the like on an extract or an acid decomposition product of the extract.

The arabinogalactan according to the present invention may be one prepared by a method for chemical synthesis of a polysaccharide which is known to those skilled in the art. Examples of the method for chemical synthesis of a polysaccharide include a staged condensation method, a polycondensation method, and a ring-opening polymerization method.

As shown in Examples described later, the arabinogalactan according to the present invention can reduce astringency from catechins which are one of astringent substances. Therefore, the arabinogalactan according to the present invention can be an astringency reducing agent used for reducing astringency by blending the arabinogalactan into an oral product (for example, a medicament, a quasi-pharmaceutical product or a food product) containing an astringent substance, and can be used for producing the relevant astringency reducing agent.

Here, the "astringency" refers to a numbness feeling in the mouth which is perceived with shrinkage of the entire mucous membrane in the mouth excluding taste buds and taste cells, different from bitterness perceived by taste receptor, and the astringency is not categorized as a "sense of taste".

The astringent substance is not particularly limited as long as it has astringency, and a functional material having astringency is preferable. For example, polyphenol, aluminum ammonium sulfate, aluminum potassium sulfate, aluminum chloride and the like are exemplified.

As typical examples of the polyphenol, flavonoids, phenylpropanoids, hydrolytic tannins, stilbenoids and the like are exemplified. The flavonoids include non-polymeric catechins, condensed tannins, theaflavin, quercetin, rutin, flavangenol and pycnogenol, the phenylpropanoids include chlorogenic acid, coffeic acid, ferulic acid and rosmarinic acid, the hydrolytic tannins include tannic acid, pentagalloylglucose, gallic acid, ellagic acid and ellagitannin, and the stilbenoids include resveratrol.

The "non-polymeric catechin" is a collective term for non-epiform catechins such as catechin, gallocatechin, catechin gallate and gallocatechin gallate, and epiform catechins such as epicatechin, epigallocatechin, epicatechin gallate and epigallocatechin gallate. The "gallate of non-polymeric catechin" is a collective term for catechin gallate, gallocatechin gallate, epicatechin gallate, epigallocatechin gallate and the like.

The "chlorogenic acid" is a collective term for mono-caffeoylquinic acids including 3-caffeoylquinic acid, 4-caffeoylquinic acid and 5-caffeoylquinic acid, monoferlaquinic acids including 3-ferlaquinic acid, 4-ferlaquinic acid and 5-ferlaquinic acid, and dicaffeoylquinic acids including 3,4-dicaffeoylquinic acid, 3,5-dicaffeoylquinic acid and 4,5-dicaffeoylquinic acid.

The astringency reducing agent of the present invention can be used as a material or a formulation to be blended into a composition (oral product) containing an astringent substance. That is, the astringency reducing agent may be one consisting of the arabinogalactan according to the present invention, or one containing carriers for formulation such as an excipient, a binder, an extender and a diluent in addition to the arabinogalactan.

The oral product in which the astringency reducing agent of the present invention is used is not particularly limited as long as it contains an astringent substance and is orally ingestible, and the oral product may be liquid or solid. Examples thereof include medicaments, quasi-pharmaceutical products and food products having the astringency. The dosage form of each of the medicament and the quasi-pharmaceutical product is not particularly limited as long as it is a formulation for oral administration, and the dosage form may be any of known dosage forms such as a granule, a tablet, a lozenge and a syrup. As the quasi-pharmaceutical product, for example, toothpastes, mouth washes, mouth rinses and the like are exemplified. The medicament and the quasi-pharmaceutical product can be produced in accordance with conventional methods, and known additives such as an excipient can be included during formulation.

Examples of the food product include food products and beverages containing an astringent substance, and food products and beverages to which an astringent substance has been added. The food product can be produced by a conventional method depending on the type thereof. Examples of the food product and beverage containing an astringent substance include beverages such as green tea, black tea, oolong tea, wine, persimmon tea, guava leaf tea and onion skin tea, and food products containing any of these beverages.

From the viewpoint of being likely to benefit from the effects of the present invention, the oral product is preferably a food product, more preferably a beverage. Examples of the food product include citrus fruits such as grapefruit, orange and lemon, or fruit juices obtained from these fruits; vegetables such as tomato, green pepper, celery, gourd, carrot, potato and asparagus, or vegetable juices obtained from these vegetables; beverages such as coffee, cocoa, green tea, black tea, oolong tea, cold drinks, wine and beer; seasonings such as sauce, soy sauce, soybean paste, hot pepper and umami seasoning; soy food products such as soymilk; emulsified food products such as cream, dressing, mayonnaise and margarine; fishery processed foodstuffs such as fish meat, minced fish and fish eggs; nuts such as peanut; fermented food products such as natto; edible meats or processed food products thereof; pickles; noodles; soups including powdered soup; dairy products such as cheese and cow milk; breads and cakes; and confectioneries such as snack food, biscuit, rice biscuit, chewing gum, chocolate and candy.

The amount of the arabinogalactan according to the present invention used in an oral product is not particularly limited as long as it is an amount effective for reducing astringency, and the amount can be appropriately set depending on the types of astringent substance and oral product, and astringent intensity. For example, the amount of the arabinogalactan used is preferably 0.0005 or more, more preferably 0.001 or more, more preferably 0.0025 or more, and preferably 0.8 or less, more preferably 0.1 or less, more preferably 0.035 or less, or preferably from 0.0005 to 0.8, more preferably from 0.001 to 0.1, more preferably from 0.0025 to 0.035, in terms of mass ratio to the astringent substance [arabinogalactan/astringent substance].

In this case, the content of an astringent substance in the oral product is preferably from 0.001 to 0.8 mass %, more preferably from 0.005 to 0.7 mass %, more preferably from 0.008 to 0.6 mass %, more preferably from 0.03 to 0.4 mass %.

From the viewpoint of reducing astringency, the content of the arabinogalactan according to the present invention in an oral product is preferably 0.0001 mass % or more, more preferably 0.00015 mass % or more, more preferably 0.00025 mass % or more, and preferably 0.08 mass % or less, more preferably 0.01 mass % or less, more preferably 0.005 mass % or less. The content is preferably from 0.0001 to 0.08 mass %, more preferably from 0.00015 to 0.01 mass %, more preferably from 0.00025 to 0.005 mass %.

Regarding the embodiments described above, further the following aspects are disclosed in the present invention.

<1> An astringency reducing agent comprising an arabinogalactan which has a molecular weight of from 10,000 to 1,000,000, preferably 20,000 or more, 35,000 or more, 50,000 or more, or 65,000 or more, and preferably 500,000 or less, 350,000 or less, or 200,000 or less and in which the ratio of 1,3-bound galactose to total galactose is 12 mol % or more, as an active ingredient.

<2> The astringency reducing agent according to <1>, wherein the ratio of 1,3-bound galactose to total galactose is preferably 16 mol % or more, more preferably 18 mol % or more, more preferably 20 mol % or more, more preferably 22 mol % or more, and preferably 70 mol % or less, more preferably 60 mol % or less, more preferably 50 mol % or less, or preferably from 12 to 70 mol %, more preferably from 16 to 70 mol %, more preferably from 18 to 70 mol %, more preferably from 20 to 60 mol %, more preferably from 22 to 50 mol %.

<3> The astringency reducing agent according to <1> or <2>, wherein the molecular weight is from 10,000 to 500,000, preferably from 20,000 to 500,000, more preferably from 35,000 to 350,000, more preferably from 50,000 to 350,000, more preferably from 65,000 to 200,000.

<4> The astringency reducing agent according to any of <1> to <3>, wherein astringency from polyphenol is reduced.

<5> The astringency reducing agent according to <4>, wherein the polyphenol comprises a non-polymeric catechin.

<6> A method for reducing astringency, comprising the step of blending the astringency reducing agent according to any of <1> to <5> into an oral product comprising an astringent substance.

<7> The method according to <6>, wherein the amount of the arabinogalactan used in the oral product is preferably 0.0005 or more, more preferably 0.001 or more, more preferably 0.0025 or more, and preferably 0.8 or less, more preferably 0.1 or less, more preferably 0.035 or less, or preferably from 0.0005 to 0.8, more preferably from 0.001 to 0.1, more preferably from 0.0025 to 0.035, in terms of mass ratio to an astringent substance [arabinogalactan/astringent substance].

<8> The method according to <6>, wherein the content of an arabinogalactan according to the present invention in the oral product is preferably 0.0001 mass % or more, more preferably 0.00015 mass % or more, more preferably 0.00025 mass % or more, and preferably 0.08 mass % or less, more preferably 0.01 mass % or less, more preferably 0.005 mass % or less, or preferably from 0.0001 to 0.08 mass %, more preferably from 0.00015 to 0.01 mass %, more preferably from 0.00025 to 0.005 mass %.

<9> Use of an arabinogalactan which has a molecular weight of from 10,000 to 1,000,000, preferably 20,000 or more, 35,000 or more, 50,000 or more, or 65,000 or more, and preferably 500,000 or less, 350,000 or less, or 200,000 or less and in which the ratio of 1,3-bound galactose to total galactose is 12 mol % or more, for producing an astringency reducing agent.

<10> The use according to <9>, wherein the ratio of 1,3-bound galactose to total galactose is preferably 16 mol % or more, more preferably 18 mol % or more, more preferably 20 mol % or more, more preferably 22 mol % or more, and preferably 70 mol % or less, more preferably 60 mol % or less, more preferably 50 mol % or less, or preferably from 12 to 70 mol %, more preferably from 16 to 70 mol %, more preferably from 18 to 70 mol %, more preferably from 20 to 60 mol %, more preferably from 22 to 50 mol %.

<11> The use according to <9> or <10>, wherein the molecular weight is from 10,000 to 500,000, preferably from 20,000 to 500,000, more preferably from 35,000 to 350,000, more preferably from 50,000 to 350,000, more preferably from 65,000 to 200,000.

<12> The use according to any of <9> to <11>, wherein the astringency reducing agent reduces astringency from polyphenol.

<13> The use according to <12>, wherein the polyphenol comprises a non-polymeric catechin.

<14> Use of an arabinogalactan which has a molecular weight of from 10,000 to 1,000,000, preferably 20,000 or more, 35,000 or more, 50,000 or more, or 65,000 or more, and preferably 500,000 or less, 350,000 or less, or 200,000 or less and in which the ratio of 1,3-bound galactose to total galactose is 12 mol % or more, for reducing astringency.

<15> The use according to <14>, wherein the ratio of 1,3-bound galactose to total galactose is preferably 16 mol % or more, more preferably 18 mol % or more, more preferably 20 mol % or more, more preferably 22 mol % or more, and preferably 70 mol % or less, more preferably 60 mol % or less, more preferably 50 mol % or less, or preferably from 12 to 70 mol %, more preferably from 16 to 70 mol %, more preferably from 18 to 70 mol %, more preferably from 20 to 60 mol %, more preferably from 22 to 50 mol %.

<16> The use according to <14> or <15>, wherein the molecular weight is from 10,000 to 500,000, more preferably from 50,000 to 350,000, more preferably from 65,000 to 200,000.

<17> The use according to any of <14> to <16>, wherein astringency from polyphenol is reduced.

<18> The use according to <17>, wherein the polyphenol comprises a non-polymeric catechin.

<19> The use according to any of <14> to <18>, wherein the amount of the arabinogalactan used in the oral product is preferably 0.0005 or more, more preferably 0.001 or more, more preferably 0.0025 or more, and preferably 0.8 or less, more preferably 0.1 or less, more preferably 0.035 or less, or preferably from 0.0005 to 0.8, more preferably from 0.001 to 0.1, more preferably from 0.0025 to 0.035, in terms of mass ratio to an astringent substance [arabinogalactan/astringent substance].

<20> The use according to any of <14> to <18>, wherein the content of the arabinogalactan according to the present invention in the oral product is preferably 0.0001 mass % or more, more preferably 0.00015 mass % or more, more preferably 0.00025 mass % or more, and preferably 0.08 mass % or less, more preferably 0.01 mass % or less, more preferably 0.005 mass % or less, or preferably from 0.0001 to 0.08 mass %, more preferably from 0.00015 to 0.01 mass %, more preferably from 0.00025 to 0.005 mass %.

EXAMPLES

Production Example 1: Purification of Pear Arabinogalactan 100 mL of pure water was added to 20 g of 6-fold concentrated pear juice (KAKOH CO., LTD.), and the mixture was subjected to ultrafiltration (Amicon from Merck Millipore Corporation) with a UF flat membrane having a molecular weight cutoff of 10 kDa (Ultracel from Merck Millipore Corporation). Water was further added, and the ultrafiltration was repeated three times. The non-passing fractions were collected, freeze-dried, and then purified by gel filtration chromatography (Sephadex G-100, 20×280 mm, eluting solution: 0.1% aqueous acetic acid solution) to obtain 13.1 mg of a pear arabinogalactan.

Production Example 2: Green Coffee Arabinogalactan 2,000 mL of pure water was added to 200 g of pulverized green coffee beans (Brazil Santos #2 obtained from Matsuya Coffee), the mixture was extracted at 100° C. for 45 to 60 minutes, and then subjected to filtration with filter paper (ADVANTEC #1) to obtain an extract, and the extract was freeze-dried to obtain 44.34 g of extract powder. This was dissolved again in 440 mL of pure water, 17.6 g of formic acid was then added, the mixture was cooled to 5° C., and centrifuged (3,000 rpm, 30 min) to remove the precipitate. To about 500 mL of the obtained liquid part was added 2,500 mL of 99.5% v/v % ethanol, the mixture was then centrifuged to collect the precipitate, and freeze-drying was performed to obtain 4.28 g of a crude polysaccharide fraction.

To 4.28 g of the crude polysaccharide fraction were added 100 mL of a 50 mM aqueous sodium hydroxide solution and 130 mL of a saturated aqueous barium hydroxide solution, and the mixture was left standing at room temperature for 3 hours, and then centrifuged (3,000 rpm, 30 min) to remove the precipitate. The obtained liquid part was adjusted to a pH of 4 by adding 1 N diluted sulfuric acid, the mixture was centrifuged again (3,000 rpm, 30 min) to remove the precipitate. To the liquid part was added 1,450 mL of 99.5 v/v % ethanol to form a precipitate, and this was collected and freeze-dried to obtain 1.18 g of a crude arabinogalactan fraction.

Ion components were removed from the crude arabinogalactan fraction with 100 mL of Dowex Marathon MR-3H+/OH− Type, and freeze-drying was then performed to obtain 0.71 g of a green coffee arabinogalactan.

Production Example 3: Purification of Radish Arabinogalactan 800 mL of pure water was added to 80 g of dry powder of a dried radish root (Kodama Foods Co., Ltd.), and the mixture was heated, and extracted in boiled water for 4 hours. The extract was allowed to cool, and then filtered with filter paper (Kiriyama Filter Paper No. 5A), and the filtrate was freeze-dried to obtain 51.7 g of extract powder. To this was added pure water to a total weight of 220 g to dissolve the powder, 330 mL of 99.5 v/v % ethanol was added, and the mixture was left standing overnight at room temperature. Thereafter, centrifugation was performed (3,000 rpm, 30 min) to remove the supernatant, and the precipitate was washed twice with 250 mL of 70 v/v % ethanol. The obtained precipitate was dissolved in pure water, and the solution was freeze-dried to obtain 3.74 g of a solid. 300 mg of the solid was weighed and taken, and dissolved in 3 mL of pure water. To this was added 0.1 mL of pectinase (SIGMA, Pectinase from *Aspergillus aculeatus*), and the mixture was incubated at 40° C. for 90 minutes, then heated to 90° C. or higher to deactivate the pectinase, and allowed to cool. 5 mL of pure water and 12 mL of 99.5 v/v° ethanol were added, and the mixture was left standing overnight at −20° C. This was centrifuged (3,000 rpm, 30 min) to remove the supernatant, and the precipitate was washed twice with 5 mL of 70 v/v % ethanol. The obtained precipitate was dissolved in pure water, and the undissolved precipitate was removed by centrifugation (3,000 rpm, 30 min). The obtained supernatant was freeze-dried to obtain 84.3 mg of a radish arabinogalactan.

Production Example 4: Purification of Larch Arabinogalactan 94.7 mg of Resist Aid (Lonza K.K.) was dissolved in 3 mL of pure water, and the solution was subjected to electrodialysis (ASTOM, MICRO ACILYZER S1) with a dialytic membrane having a molecular weight cutoff of 300 Da to obtain 86 mg of a larch arabinogalactan.

Production Example 5: Purification of Japanese Pear Arabinogalactan 1.9 L of pure water was added to 480 g of 5-fold concentrated Japanese pear juice (KAKOH CO., LTD.), and the mixture was subjected to ultrafiltration (Amicon from Merck Millipore Corporation) with a UF flat membrane having a molecular weight cutoff of 10 kDa (Ultracel from Merck Millipore Corporation). Water was further added, and the ultrafiltration was repeated three times. The non-passing fractions were collected, and freeze-dried to obtain 253 mg of a Japanese pear arabinogalactan.

Production Example 6: Purification of Roasted Coffee Arabinogalactan 90 mL of pure water was added to 10 g of a hot water extract of roasted coffee beans (Kao Corporation), 0.1 mL of pectinase (SIGMA, Pectinase from *Aspergillus aculeatus*) was added, and the mixture was incubated at 40° C. for 90 minutes, then heated to 90° C. or higher to deactivate the pectinase, and allowed to cool. 50 mL of the resulting solution was taken, 50 mL of 99.5 v/v % ethanol was added, and the mixture was left standing overnight at −20° C. This was centrifuged (3,000 rpm, 30 min) to remove the supernatant, and the precipitate was washed twice with 10 mL of 50 v/v % ethanol. The obtained precipitate was dissolved in pure water, and the solution was freeze-dried to obtain 642 mg of a roasted coffee arabinogalactan.

Test Example: Analysis of Arabinogalactan

1. Measurement of Molecular Weight

The peak top molecular weights of the arabinogalactans of Production Examples 1 to 6 and gum arabic (CREO GUM #4810 from CREO International Corp.) were determined by GPC-RI analysis.

<GPC-RI Analysis Conditions>
  HPLC system: Chromaster (Hitachi High-Tech Corporation)
  Column: TSKgel GWPWxl 7.8×300 mm (TOSOH CORPORATION)
  Guard column: TSKgel PWxl 6×40 mm
  Eluting solution: 0.2 M phosphate buffer (pH 6.8)/acetonitrile=9:1
  Flow rate: 1.0 mL/min
  Column temperature: 40° C.
  Detection: RI
  Standard substance: Shodex Standard P-82 (Shoko Co., Ltd.)

2. Analysis of L-Arabinose and D-Galactose (Constituent Sugar Analysis)

About 5 mg of each of the arabinogalactans of Production Examples 1 to 6 and gum arabic (CREO GUM #4810 from CREO International Corp.) was weighed and taken in a screw-top test tube, 5 mL of a 2 N methanol hydrochloride solution was added, and the mixture was heated with a block heater at 80° C. for 18 hours, allowed to cool, and then concentrated under a nitrogen flow. 1 mL of isopropanol was added, and the mixture was concentrated again.

To this was added 5 mL of a 2 N aqueous trifluoroacetic acid solution, and the mixture was heated with a block heater at 110° C. for 1 hour to perform hydrolysis, and allowed to cool. 10 mL of a 1 N aqueous sodium hydroxide solution was then added to perform neutralization and obtain a volume of 20 mL, followed by determination of constituent ratios (mol %) of L-arabinose and D-galactose by ion chromatography analysis.

<Ion Chromatography Analysis Conditions>
  System: Dionex ICS-5000 (Thermo Fisher Scientific K.K.)
  Detector: Dionex ICS-5000 ED Electrochemical detector (Thermo Fisher Scientific K.K.)
  Column: Dionex CarboPac PA1 4×250 mm
  Guard column: Dionex CarboPac PA1 4×50 mm
  Flow rate: 1 mL/min
  Column temperature: 25° C.
  Compartment temperature: 35° C.
  Diluting solution A: Ultrapure water
  Diluting solution B: 18 mM aqueous sodium hydroxide
  Diluting solution C: 200 mM aqueous sodium hydroxide
  Diluting solution D: 150 mM sodium acetate and 100 mM sodium hydroxide aqueous solution
  Concentration gradient conditions (vol %): Table 1 below

TABLE 1

| Time | Eluting solution A | Eluting solution B | Eluting solution C | Eluting solution D |
| --- | --- | --- | --- | --- |
| 0 min | 95% | 0% | 5% | 0% |
| 25 min | 95% | 0% | 5% | 0% |
| 26 min | 0% | 0% | 100% | 0% |
| 36 min | 0% | 0% | 100% | 0% |
| 37 min | 95% | 0% | 5% | 0% |
| 47 min | 95% | 0% | 5% | 0% |

3. Methylation Analysis

The methylation analysis is performed for determining a position at which monosaccharides are bound to each other in a polysaccharide. It is possible to calculate a proportion of monosaccharides having a bond at a certain position in the polysaccharide. The process involves the following four steps:
1) fully methylating a polysaccharide;
2) hydrolyzing the fully methylated polysaccharide into partially methylated monosaccharides;
3) acetylating non-methylated hydroxy groups to perform conversion into partially methylated partially acetylated alditol acetates (PMAA) derivatives; and
4) separating and analyzing the derivatives by GC-MS.

For the methylation analysis, a full methylation method using solid sodium hydroxide was used by reference to the protocol by F. A. Pettolino et al. (Nature Protocols, 2012, 7, 1590-1607.). For the full methylation method, a method using a methylsulfinyl carbanion reagent and called a Hakomori method, and the like are also used, and analysis results do not depend on methods.

1) Full Methylation

About 0.6 mg of each of the arabinogalactans of Production Examples 1 to 6 was weighed and taken in a screw-top test tube, and dissolved in 0.5 mL of dehydrated DMSO, and the inside of the test tube was brought into a nitrogen atmosphere. 0.5 mL of powdered sodium hydroxide dispersed in dehydrated DMSO (120 mg of NaOH/1 mL of DMSO) was added together with the DMSO, and the mixture was subjected to ultrasonic treatment for 30 minutes. To this was added 0.1 mL of methyl iodide, and the mixture was subjected to ultrasonic treatment for 10 minutes. Further, 0.1 mL of methyl iodide was added, and the mixture was subjected to ultrasonic treatment for 10 minutes. Thereafter, the 0.2 mL of methyl iodide was added, and the mixture was subjected to ultrasonic treatment for 20 minutes. Subsequently, 2 mL of ultrapure water and 1.5 mL of dichloromethane were added, and the mixture was vortexed to remove the aqueous layer. The step of adding 2 mL of ultrapure water to the dichloromethane layer and vortexing the mixture to remove the aqueous layer was repeated three times, and the obtained dichloromethane layer was transferred into a screw-top test tube. Nitrogen was sprayed to remove dichloromethane, thereby achieving dryness to obtain a fully methylated polysaccharide.

2) Hydrolysis

To the obtained fully methylated polysaccharide was added 0.2 mL of ultrapure water to dissolve the fully methylated polysaccharide. 0.2 mL of 4 N TFA was added, and the mixture was heated with a block heater at 120° C. for 1 hour to perform hydrolysis, allowed to cool, and concentrated by centrifugation. The step of adding 0.5 mL of ultrapure water and concentrating the mixture by centrifugation was repeated three times to obtain a partially methylated monosaccharide.

3) Conversion into PMAA Derivative

To the obtained partially methylated monosaccharide were added 0.5 mL of 2 M aqueous ammonia and 10 mg of sodium borohydride, and the mixture was reacted at room temperature for two and a half hours. After the reaction, the reaction product was neutralized with 90 µL of acetic acid, and concentrated by centrifugation. The step of adding 250 µL of 5 v/v % of an acetic acid-methanol solution thereto and concentrating the mixture by centrifugation was repeated twice. Further, the step of adding 250 µL of methanol and concentrating the mixture by centrifugation was repeated twice to achieve dryness. Next, 250 µL of acetic anhydride was added, and the mixture was heated with a block heater at 100° C. for two and a half hours, and allowed to cool. 2 mL of ultrapure water and 1.5 mL of dichloromethane were added, the resultant was mixed with a test tube mixer, and the aqueous layer was removed. The step of adding 2 mL of ultrapure water to the dichloromethane layer, mixing the resultant with a test tube mixer and removing the aqueous layer was repeated three times, and the obtained dichloromethane layer was transferred into another screw-top test tube. Nitrogen was spraying to remove dichloromethane, thereby obtaining a PMAA derivative.

4) GC-MS Analysis

The obtained PMAA derivative was dissolved in 50 µL of chloroform, and the solution was analyzed by GCMS.

<GCMS Measurement Conditions>

GC: Agilent 7890B
MS: Agilent 5977B
Column: DB-5 ms+DG (Agilent J & W, 30 m×0.25 mm)
Injection temperature: 210° C.
Interface temperature: 270° C.
Column temperature: 150° C. (5 min)→250° C. (5° C./min)→250° C. (5 min)
Carrier gas: Helium 4. Measurement of astringent intensity 10 standard aqueous solutions having different astringent intensities were made by adjusting the addition concentration of a catechin formulation (Teavigo, obtained from DSM Nutrition Japan K.K., containing epigallocatechin gallate at 94 mass % or more) in stages as in Table 2. To a catechin formulation solution at 1.0 g/L, each of the arabinogalactans was added at 0.00025 w/v % to make a test beverage. Four expert panelists selected through sensory evaluation a standard aqueous solution recognized as having an astringent intensity equivalent to that of the test beverage among the 10 standard aqueous solutions. For the astringent intensity of the selected standard aqueous solution, the average across the panelists was determined, and taken as a value of astringent intensity of the test beverage.

TABLE 2

| Standard aqueous solution | |
|---|---|
| Astringent intensity | Concentration of catechin formulation (g/L aq.) |
| 1 | 0.1 |
| 2 | 0.2 |
| 3 | 0.3 |
| 4 | 0.4 |
| 5 | 0.5 |
| 6 | 0.6 |
| 7 | 0.7 |
| 8 | 0.8 |
| 9 | 0.9 |
| 10 | 1.0 |

Example 1 and Comparative Example 1

Table 3 shows the results of analysis and measurement of astringent intensity for the arabinogalactans of Production Examples 1 to 6 and gum arabic (CREO GUM #4810 from CREO International Corp.). For evaluation criteria on reduction of astringency, a beverage having an astringent intensity of less than 8 was evaluated as having an astringency reducing effect. The results of methylation analysis for gum arabic were prepared on the basis of literature (TALANTA, 1983, 30, 11, 887-893). As is apparent from Table 3, the arabinogalactans used for the evaluation here are type II arabinogalactans containing 3-Galp as a main component, and do not include type I arabinogalactans containing 4-Galp as a main component. Among them, arabinogalactans having an astringency reducing effect have been found to have no characteristic constituent ratios of galactose and arabinose and exhibit an effect when the molar ratio of 3-Galp to total galactose is 12° or more (there is little branching from the main chain) and the molecular weight is 10,000 or more.

In methylation analysis, bonding position information on arabinose and galactose which are constituent sugars of arabinogalactans, and all other sugar residues is obtained, and here, the ratio of each galactose residue, where the summed amount of all exclusively galactose residues is defined as 100 mol %, is shown. In the context of reduction of astringency, it is important that there is little branching from the main chain, and in the type II arabinogalactan, the main backbone is composed of galactose, and arabinose and a very small amount of other sugars are all bound to the side chain. Therefore, the comparison was made only on galactose residues.

The roasted coffee arabinogalactan has a high molar ratio of 3-Galp like the green coffee arabinogalactan, but has a small molecular weight and no astringency reducing effect. This may be because the green coffee arabinogalactan had glycoside bonds cleaved by heat from roasting, and thus was formed into small fractions while maintaining the structure. This may attenuate the astringency reducing effect, and therefore it is thought that a molecular weight of 10,000 or more is necessary for exhibition of the effect.

K.K.) with 1 L of boiled water for 10 minutes, a pear arabinogalactan was added at 0.01 w/v % to make a test beverage 2-3.

Test Beverage 2-4

To tea obtained by decocting eight packages of 1 g of onion skin tea (Onion Skin Tea manufactured by Orihiro Plantdew K.K.) with 1 L of boiled water for 10 minutes, a pear arabinogalactan was added at 0.01 w/v° to make a test beverage 2-4.

(2) Evaluation on Astringency

Four expert panelists performed sensory evaluation on the astringency of each of the test beverages 2-1 to 2-4 in accordance with the following evaluation criteria. The panelists made a comparison between astringencies before and after addition of the pear arabinogalactan to evaluate whether the astringency was reduced or not. The beverage was rated as "Very Good" when the number of panelists who evaluated that the astringency had been reduced was 4. The beverage was rated as "Good" when the number of such panelists was 3. The beverage was rated as "Fair" when the number of such panelists was 2. The beverage was rated as "Poor" when the number of such panelists was 1 or 0.

<Evaluation Criteria>

Very Good: Astringency was markedly reduced.
Good: Astringency was reduced.
Fair: Astringency was not significantly reduced.
Poor: Astringency was not reduced.

TABLE 3

|  |  | Example 1-1 | Example 1-2 | Example 1-3 | Comparative Example 1-1 | Comparative Example 1-2 | Comparative Example 1-3 | Comparative Example 1-4 |
|---|---|---|---|---|---|---|---|---|
| Arabinogalactan |  | Pear | Green coffee | Radish | Larch Resist Aid | CREO GUM #4810 | Japanese pear | Roasted coffee |
| Molecular weight (Mp) |  | 67000 | 112000 | 55000 | 15000 | 154000 | 67000 | 8000 |
| L-arabinose (mol %) |  | 48 | 41 | 7 | 18 | 34 | 46 | 10 |
| D-galactose (mol %) |  | 43 | 56 | 18 | 69 | 40 | 19 | 75 |
| Methylation analysis* | t-Galp | 5.7 | 5.5 | 23.1 | 25.2 | 6.4 | 20.4 | 22.3 |
| (mol %) | 3-Galp | 13.2 | 21.2 | 27.1 | 2.9 | 1.1 | 5.3 | 34.6 |
|  | 6-Galp | 8.6 | 5.5 | 5.2 | 22.6 | 9.2 | 3.7 | 7.8 |
|  | 3,6-Galp | 36.8 | 31.8 | 2.6 | 35.6 | 42.0 | 17.8 | 22.7 |
|  | t-Araf | 12.1 | 15.1 | 39.8 | 5.4 | 28.0 | 17.1 | 4.9 |
|  | 3-Araf | 1.7 | 1.1 | — | 8.4 | 13.2 | 2.6 | 1.1 |
|  | 5-Araf | 21.9 | 19.8 | 2.3 | — | — | 33.0 | 6.6 |
| Astringent intensity |  | 7.6 | 4.5 | 7.6 | 10 | 10 | 9.5 | 8.6 |

*Methylation analysis: molar ratio of each type of residue where the summed amount of arabinose residues and galactose residues is defined as 100%
t-Galp: terminal galactopyranose;
3-Galp: galactopyranose having a bond at positions 1 and 3;
6-Galp: galactopyranose having a bond at positions 1 and 6;
3,6-Galp: galactopyranose having a bond at positions 1, 3 and 6;
t-Araf: terminal arabinofuranose;
3-Araf: arabinofuranose having a bond at positions 1 and 3;
5-Araf: arabinofuranose having a bond at positions 1 and 5

Example 2

(1) Preparation of Beverage

Test Beverage 2-1

To an aqueous of theaflavin at a concentration of 1.0 g/L (Theaflavin Powder 1%, obtained from YOKOHAMA OLIS & FATS INDUSTRY CO., LTD.), a pear arabinogalactan was added at 0.01 w/v % to make a test beverage 2-1.

Test Beverage 2-2

To an aqueous solution of tannic acid at a concentration of 1.0 g/L (Tannic Acid AL, obtained from FUJI CHEMICAL INDUSTRIES CO., LTD.), a pear arabinogalactan was added at 0.01 w/v % to make a test beverage 2-2.

Test Beverage 2-3

To tea obtained by decocting four packages of 2 g of guava leaf tea (Bankitocha manufactured by Yuuki Seiyaku

TABLE 4

|  | Example 2-1 | Example 2-2 | Example 2-3 | Example 2-4 |
|---|---|---|---|---|
| Evaluation on astringency | Very Good | Very Good | Very Good | Good |

The invention claimed is:

1. An astringency reducing agent, comprising
   an arabinogalactan which has a molecular weight of from 10,000 to 1,000,000 and a ratio of 1,3-bound galactose to total galactose of 18 mol % to 60 mol %, as an active ingredient; and
   at least one carrier for formulation, selected from the group consisting of an excipient, a binder, an extender, and a diluent, wherein the astringency reducing agent is substantially free of proteins, lipids, and carbohydrates other than the arabinogalactan.

2. The astringency reducing agent according to claim 1, wherein the ratio of 1,3-bound galactose to total galactose is from 18 to 50 mol %.

3. The astringency reducing agent according to claim 1, wherein the molecular weight is from 10,000 to 500,000.

4. The astringency reducing agent according to claim 1, wherein astringency from polyphenol is reduced.

5. The astringency reducing agent according to claim 4, wherein the polyphenol comprises a non-polymeric catechin.

6. A method for reducing astringency, comprising blending an astringency reducing agent, comprising an arabinogalactan having a molecular weight of from 10,000 to 1,000,000 and a ratio of 1,3-bound galactose to total galactose of 18 mol % to 50 mol % as an active ingredient into an oral product comprising an astringent substance.

7. The method for reducing astringency according to claim 6, wherein the oral product comprising an astringent substance is at least one beverage selected from green tea, black tea and oolong tea or a food product containing any of these beverages.

8. The astringency reducing agent according to claim 1, wherein the arabinogalactan is a pear-derived arabinogalactan isolated from pear.

9. The method according to claim 6, wherein the astringency reducing agent is substantially free of proteins, lipids, and carbohydrates other than the arabinogalactan.

* * * * *